United States Patent
McDaid et al.

(10) Patent No.: US 12,333,241 B2
(45) Date of Patent: Jun. 17, 2025

(54) INTEGRATING NON-NATIVE DEPENDENCIES IN SPREADSHEET APPLICATIONS

(71) Applicant: Microsoft Technology Licensing, LLC, Redmond, WA (US)

(72) Inventors: Joseph John McDaid, Seattle, WA (US); Su-Piao Wu, Sammamish, WA (US); Alexander Yuryevich Novokhodko, Redmond, WA (US); Guido Van Rossum, Belmont, CA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 18/450,887

(22) Filed: Aug. 16, 2023

(65) Prior Publication Data
US 2025/0061271 A1    Feb. 20, 2025

(51) Int. Cl.
G06F 3/048    (2013.01)
G06F 40/18    (2020.01)

(52) U.S. Cl.
CPC .................................. *G06F 40/18* (2020.01)

(58) Field of Classification Search
CPC ...................................................... G06F 40/18
See application file for complete search history.

(56) References Cited

U.S. PATENT DOCUMENTS 7,099,890 B2 * 8/2006 Cahill ..................... G06F 40/18
715/213
7,475,082 B1   1/2009 De et al.
(Continued)

FOREIGN PATENT DOCUMENTS

AU    2005202721 B2 *  8/2010  ........... G06F 17/246
CN    114936027 A   *  8/2022
(Continued)

OTHER PUBLICATIONS

Notice of Allowance mailed on Feb. 23, 2024, in U.S. Appl. No. 17/945,417, 2 pages.
(Continued)

*Primary Examiner* — Rashawn N Tillery

(57) ABSTRACT

Technology is disclosed herein for integrating native and non-native dependencies in a spreadsheet hosted by a spreadsheet application. In an implementation, a computing apparatus identifies a formula in a first cell of a spreadsheet which includes a non-native argument. The computing apparatus identifies a dependency between the first cell and a second cell created by the non-native argument. The computing apparatus limits recalculations of the spreadsheet based at least on the dependency. In an implementation, absent any other dependencies between the first cell and other cells, the first cell is excluded from recalculations triggered by changes to the other cells and included in recalculations triggered by the second cell. In an implementation, a direct or indirect dependency is created by, respectively, an explicit or implicit reference to the second cell in the non-native argument. In some implementations, the formula is native to the spreadsheet application hosting the spreadsheet.

20 Claims, 13 Drawing Sheets

(56) References Cited

U.S. PATENT DOCUMENTS

| | | | | |
|---|---|---|---|---|
| 7,523,395 | B1* | 4/2009 | Namait | G06F 16/958 715/255 |
| 9,875,226 | B1* | 1/2018 | Gundrum | G06F 40/18 |
| 11,170,165 | B1* | 11/2021 | Smith Devine | G06F 21/6227 |
| 11,537,785 | B1 | 12/2022 | Goyal et al. | |
| 11,625,527 | B1* | 4/2023 | Von Tish | G06F 40/18 715/205 |
| 11,848,976 | B2* | 12/2023 | Logan | G06F 3/0482 |
| 11,966,690 | B2 | 4/2024 | Patel | |
| 11,966,796 | B2 | 4/2024 | Patel | |
| 12,026,560 | B2 | 7/2024 | Patel | |
| 12,045,239 | B1* | 7/2024 | Takahashi | G06F 16/26 |
| 12,229,502 | B2* | 2/2025 | Smith | G06F 16/9027 |
| 2002/0091871 | A1 | 7/2002 | Cahill et al. | |
| 2004/0210822 | A1* | 10/2004 | Kotler | G06F 40/103 715/227 |
| 2005/0015714 | A1 | 1/2005 | Cahill et al. | |
| 2005/0044497 | A1* | 2/2005 | Kotler | G06F 40/103 715/267 |
| 2006/0161844 | A1* | 7/2006 | Simkhay | G06F 40/18 715/267 |
| 2006/0224946 | A1 | 10/2006 | Barrett et al. | |
| 2007/0136652 | A1 | 6/2007 | Ellis | |
| 2013/0055058 | A1* | 2/2013 | Leong | G06F 40/18 715/219 |
| 2013/0086064 | A1 | 4/2013 | Salch et al. | |
| 2014/0136936 | A1 | 5/2014 | Patel et al. | |
| 2015/0309980 | A1* | 10/2015 | Glass | G06F 40/18 715/219 |
| 2019/0095226 | A1 | 3/2019 | Saunders et al. | |
| 2020/0004811 | A1* | 1/2020 | Gross | G06F 17/17 |
| 2020/0278850 | A1 | 9/2020 | Couillard et al. | |
| 2020/0285694 | A1* | 9/2020 | Nield | G06F 9/45504 |
| 2020/0302013 | A1* | 9/2020 | Stegmaier | G06F 40/18 |
| 2021/0081405 | A1 | 3/2021 | Zarras | |
| 2021/0357241 | A1* | 11/2021 | Srinivasan | G06F 40/205 |
| 2022/0121654 | A1* | 4/2022 | Zarras | G06F 16/24553 |
| 2022/0188505 | A1* | 6/2022 | Keslin | G06F 40/103 |
| 2022/0229974 | A1 | 7/2022 | Murphy et al. | |
| 2023/0088670 | A1 | 3/2023 | Isner | |
| 2024/0069988 | A1* | 2/2024 | Patel | G06F 9/54 |
| 2024/0069989 | A1 | 2/2024 | Patel | |
| 2024/0070383 | A1* | 2/2024 | Patel | G06F 40/18 |
| 2024/0211684 | A1* | 6/2024 | Patel | G06F 8/315 |

FOREIGN PATENT DOCUMENTS

| | | | |
|---|---|---|---|
| TW | 202103074 A | * | 1/2021 |
| WO | 2005043406 A2 | | 5/2005 |
| WO | 2020005603 A1 | | 1/2020 |

OTHER PUBLICATIONS

"Non Final Office Action Issued in U.S. Appl. No. 17/945,472", Mailed Date: Jul. 31, 2023, 37 Pages.

"Non Final Office Action Issued in U.S. Appl. No. 17/898,321", Mailed Date: Jul. 7, 2023, 34 Pages.

"Non Final Office Action Issued in U.S. Appl. No. 17/945,417", Mailed Date: Jul. 20, 2023, 40 Pages.

Roberts Tony, "Python Jupyter Notebooks in Excel-Towards Data Science", Retrieved from: https://towardsdatascience.com/python-jupyter-notebooks-in-excel-5ab34fc6439#:-:text=First%20off%2C%2oto%20run%JOPython%20code%20in%20Excel,command%20line%2otool%2oto%20install%2othe%20Excel%20add-in%3A_, Dec. 22, 2020, 10 Pages.

Notice of Allowance mailed on Mar. 1, 2024, in U.S. Appl. No. 17/945,417, 02 pages.

Notice of Allowance mailed on Mar. 13, 2024, in U.S. Appl. No. 17/898,321, 2 pages.

Ragavan, et al.; "GridBook: Natural Language Formulas for the Spreadsheet Grid"; IUI '22; Mar. 22-25, 2022; pp. 345-368; Helsinki, Finland.

Notice of Allowance mailed on Dec. 11, 2023, in U.S. Appl. No. 17/898,321, 6 pages.

Notice of Allowance mailed on Dec. 12, 2023, in U.S. Appl. No. 17/945,472, 14 pages.

Notice of Allowance mailed on Dec. 13, 2023, in U.S. Appl. No. 17/945,417, 7 pages.

Corrected Notice of Allowability mailed on Jan. 26, 2024, in U.S. Appl. No. 17/898,321, 2 pages.

Notice of Allowance mailed on Feb. 20, 2024, in U.S. Appl. No. 17/945,472, 05 pages.

"International Search Report and Written Opinion issued in PCT Application No. PCT/US2023/027694", Mailed Date: Sep. 18, 2023, 11 Pages.

Notice of Allowance mailed on Mar. 6, 2024, in U.S. Appl. No. 17/898,321, 02 pages.

Notice of Allowance mailed on Mar. 20, 2024, in U.S. Appl. No. 17/945,472, 2 pages.

"Evaluating text and calling Python functions from Excel with xlwings", Retrieved from https://newtonexcelbach.com/2017/08/23/evaluating-text-and-calling-python-functions-from-excel-with-xlwings/, Retrieved on Oct. 29, 2024, 5 pages.

Non-Final Office Action mailed on Oct. 28, 2024, in U.S. Appl. No. 18/600,118, 51 pages.

Zumstein Felix, et al., "A New Way to Automate Google Sheets with Python" May 20, 2022, 7 pages.

* cited by examiner

FIGURE 6B

INTEGRATING NON-NATIVE DEPENDENCIES IN SPREADSHEET APPLICATIONS

TECHNICAL FIELD

Aspects of the disclosure are related to the field of computer software applications and, in particular, to spreadsheet applications and associated technology.

BACKGROUND

Spreadsheet applications are computer software programs that allow users to store, organize, and analyze data in tabular form. The rows and columns of a representative worksheet define cells into which data and formulas may be entered. A given cell may simply hold data in it, such as a number or text string, or the cell may contain a formula that automatically calculates a value for the cell. Formulas can also employ functions that perform pre-defined calculations or return information about a spreadsheet. The functions may be pre-built functions provided as part of an application, or user-defined functions created by a user. User-defined functions allow users to create functions that do not already exist in their spreadsheet application. In an example, users can create user-defined functions for Microsoft® Excel spreadsheets using the Visual Basic for Applications (VBA) programming language.

More recently, proposed integrations between spreadsheets and external programming environments allow users to code user-defined functions in non-native procedural languages that can be called from within a spreadsheet macro. Such integrations allow users to leverage tools provided by non-native environments that are especially useful with respect to big data jobs. For instance, an integration between Excel and Python allows users to call Python functions from within the macros of a spreadsheet.

Unfortunately, executing non-native functions within the runtime context of a spreadsheet application presents security risks to the application and its general environment. In addition, passing large data sets between a spreadsheet and a non-native resource is a laborious task from a computational perspective and can be prohibitive for very large data sets. Finally, for such integrations to gain widespread acceptance, users must be relatively proficient with the intricacies of editing macros and properly configuring what would otherwise be an unfamiliar programming environment to users who lack the relevant domain expertise.

OVERVIEW

Technology is disclosed herein for integrating non-native dependencies in a spreadsheet hosted by a spreadsheet application. In an implementation, a computing apparatus identifies a formula in a first cell of a spreadsheet, at least a portion of which includes a non-native argument. The computing apparatus identifies a dependency between the first cell and a second cell that is created by the non-native argument. The computing apparatus limits recalculations of the spreadsheet based at least on the dependency. In an implementation, absent any other dependencies between the first cell and other cells, the first cell is excluded from recalculations triggered by changes to the other cells and is included in recalculations triggered by the second cell. In an implementation, the dependency is created by an explicit or implicit reference to the second cell in the non-native argument.

In some implementations, the formula in the first cell is native to the spreadsheet application hosting the spreadsheet. In some implementations, the formula includes the name of a function which is native to a spreadsheet application hosting the spreadsheet and which includes the non-native argument. In some implementations, when a recalculation of the spreadsheet is triggered that includes the first cell, the computing apparatus sends a request to an external resource to evaluate the non-native argument of the cell. In some implementations, the computing apparatus evaluates the second cell prior to sending the request for evaluating the non-native argument of the first cell. To evaluate the second cell, the computing apparatus may send a request to the external resource to evaluate a non-native expression in the second cell.

This Overview is provided to introduce a selection of concepts in a simplified form that are further described below in the Technical Disclosure. It may be understood that this Overview is not intended to identify key features or essential features of the claimed subject matter, nor is it intended to be used to limit the scope of the claimed subject matter.

BRIEF DESCRIPTION OF THE DRAWINGS

Many aspects of the disclosure may be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views. While several embodiments are described in connection with these drawings, the disclosure is not limited to the embodiments disclosed herein. On the contrary, the intent is to cover all alternatives, modifications, and equivalents.

FIGS. 6A and 6B illustrate an operational scenario for integrating native and non-native dependencies in an implementation.

DETAILED DESCRIPTION

Figure 1:
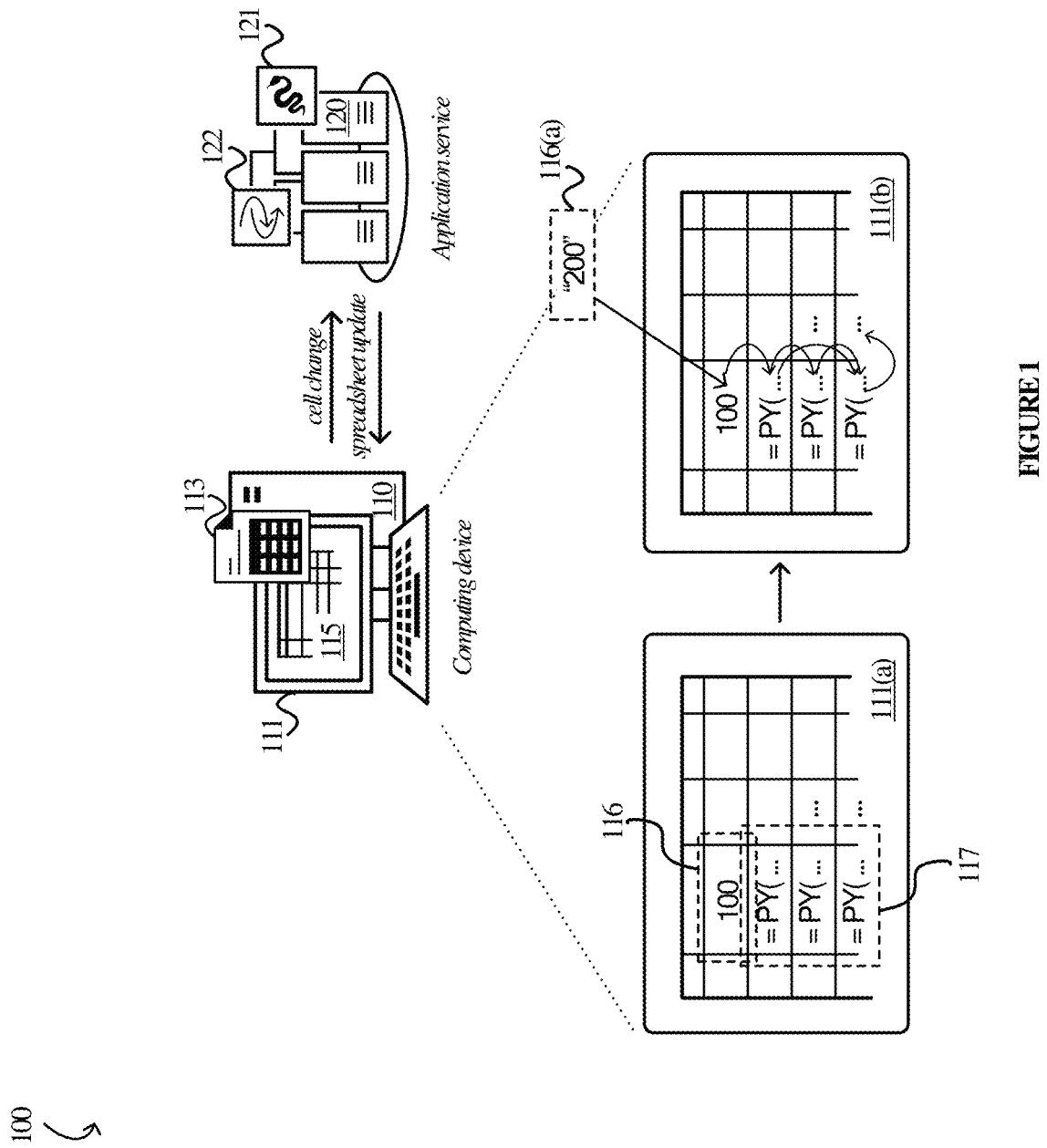
FIG. 1 illustrates an operational environment for integrating native and non-native dependencies in an implementation.

Various implementations are disclosed herein relating to the integration of an external programming language in a spreadsheet environment. In an implementation, users can integrate the non-native functionality of a programming language, such as Python or Java, with native spreadsheet functionality. The non-native functionality is integrated in a spreadsheet environment in the form of lines of code executing as functions in the cells of a spreadsheet. As the contents of a cell are changed, the application hosting the spreadsheet updates dependent cells with native functionality as well as cells with non-native functionality. An issue arises, however, when there is interdependency between cells containing non-native functionality and cells with native functionality in a spreadsheet and a recalculation is triggered by, say, a change to a value of a cell. While a global recalculation of the spreadsheet may be performed, updating cells that are not affected by the change is computationally inefficient. Moreover, global recalculations performed repeatedly as a spreadsheet is edited will be computationally expensive as well as a drag on performance, resulting in a degraded user experience.

To address this issue, when a recalculation of a spreadsheet with integrated native and non-native functionality is triggered, a static analysis of the non-native code is performed which determines non-native dependencies between the cells containing the non-native functionality. Because programming languages execute sequentially (in contrast to the native, cell-referencing operation of spreadsheets), the cells with non-native functionality are interpreted according to an ordering scheme, such as explicitly numbered lines of code or row-major ordering, from which dependencies between the cells can be deduced. The non-native dependencies are combined with native dependencies (i.e., dependencies between cells with native functionality) to identify a scope of the recalculation. Thus, not only are recalculations limited to just the cells dependent on the change, from the user's perspective, executing a spreadsheet with integrated native and non-native functionality is seamless.

For integrated Python functionality, a cell in a spreadsheet may call an external Python resource to access Python functionalities using a native function PY( ). The PY( ) function takes a non-native argument which the external resource evaluates to return a value for the cell or by which the external resource identifies non-native dependencies. For example, a cell containing=PY(z=numpy.sqrt(y)), the non-native argument "numpy.sqrt(y)" is evaluated by the external resource to determine a value for the Python variable z. The Python variable y in the argument would be defined in another Python argument preceding the cell in the order of execution.

The integration of programming language functionality such as Python makes available to spreadsheet users a number of libraries developed for complex computational domains, such as scientific computing libraries (e.g., SciPy), machine learning and deep learning libraries (e.g., TensorFlow, Keras), and computer vision libraries (e.g., OpenCV). While sequential programming is one-dimensional, integrating coding language functionality in the two-dimensional environment of a spreadsheet (while still obeying sequential ordering) creates an alternative programming environment, and one which may execute the non-native functionality with every update of the spreadsheet.

Because continual updating of an integrated spreadsheet (i.e., a spreadsheet with native and non-native functionality) can quickly become computationally expensive, to reduce excess computation, the technology disclosed herein identifies a scope of recalculation of the native and non-native functionality to minimize the number of recalculations that are performed rather than performing a global recalculation. In an implementation, when a cell is updated, the spreadsheet application identifies or "dirties" cells which depend from the updated cell and limits the scope of the recalculation to the dirty cells. Of course, as a dirty cell is updated, cells depending from the dirty cell are similarly identified and updated in the recalculation, and the process continues until no dirty cells remain. Thus, the scope of recalculation is limited to the set of cells identified according to their dependencies.

To maintain a measure of fidelity with the structure of a traditional programming language (as well as to ensure consistency in the execution order), an ordering scheme is enforced when non-native code is interpreted or when a spreadsheet is updated. Ordering schemes can include a row-major ordering scheme, an explicit ordering scheme (e.g., numbering in adjacent cells), an order based on when the cell contents were committed or edited, etc. When a cell is changed and the spreadsheet is to be updated, a scope of recalculation is identified which includes cells with native or non-native functionality the values of which are affected by the change, and the dependencies between cells with non-native functionality are determined based on the order which applies to the non-native functionality.

In an implementation, in an integrated spreadsheet, when a cell is changed, the scope of recalculation includes cells with native and non-native dependencies from the changed cell. Cells with non-native functionality which must be updated are identified based on their direct or indirect dependencies to the changed cell. To identify the non-native dependencies, the lines of code included in those cells are interpreted according to row-major order which simulates the sequential (i.e., line by line) ordering of programming languages. The non-native dependencies are translated to native dependencies according to metadata of the cells which map the lines of code to the cells containing them. Native dependencies are determined based on dependencies of cells with native syntax or are parsed from cells with non-native syntax which include native cell references. The identified non-native dependencies are then combined with native dependencies identified by the application hosting the spreadsheet, producing an integrated set of dependencies from which a scope of recalculation can be determined.

In an implementation, the static analysis performed by a resource external to the application includes translating dependencies in a non-native form to dependencies in a native form. The external resource is an engine, application, or other software component which is capable of interpreting and evaluating non-native syntax, functions, variables, etc. The external resource receives the lines of (non-native) code including metadata indicating an order of the lines based on the applicable ordering scheme. The metadata may also include references or addresses of the respective cells of the lines of code. The external resource evaluates the lines of code to determine non-native dependencies, then translates the dependencies into a native format (e.g., in terms of cell addresses). The translated dependencies are then returned to the application which determines which of the cells (with either native or non-native functionality) are to be updated based on the changed cell. In various implementations, the external resource may comprise one or more subservices for analyzing dependencies among non-native arguments and for evaluating non-native arguments. The subservices of the external resource may be accessible to the spreadsheet application via an application programming interface (API).

Dependencies between pairs of cells in spreadsheets with integrated native and non-native functionality include dependencies between cells with native functionality, between cells with non-native functionality, and between cells with native functionality depending from cells with non-native functionality and vice versa. When a cell includes a non-native expression with an explicit cell reference, the spreadsheet application may parse the non-native expression to identify the cell reference based on the syntax for the reference. For example, a cell may include the formula=PY(x=xl("B2")) which causes the application to call an external Python resource to evaluate the non-native argument x=xl("B2") of the PY function. Because the non-native argument includes an explicit dependency to cell B2, the spreadsheet application can identify the native dependency based on parsing the formula and identifying the xl( ) syntax.

Recalculations of cells in a spreadsheet based on a dependency analysis of native and non-native functionality can include computing an updated value of a cell but also performing other spreadsheet operations dependent on a cell value, such as conditional formatting or updating a data visualization or data table based on the cell value.

The process of analyzing dependencies and updating cells according to dependencies is not limited to the context of a spreadsheet application. Thus, although multiple examples are presented herein in the context of a spreadsheet application, the dependency analysis for native and non-native functionality can occur in the context of other applications capable of hosting a spreadsheet with integrated native and non-native functionality or in the context of a cloud-based service hosting a local instance of the spreadsheet on a computing device, or the process may be distributed across a client-server implementation of an application service.

Technical effects of the technology disclosed herein include a seamless integration of native and non-native functionality of a spreadsheet. Advantages of integrating non-native functionality in a spreadsheet include, for example, enabling a user to configure a process across multiple spreadsheet cells using functions native to the spreadsheet application along with sequential coding in a programming language such as Python. The lines of code can be easily and instantly examined, modified, or debugged with real-time spreadsheet updates. Integrating native functionality provides the user with multiple routes for performing data manipulation, analysis, and visualization.

In addition, recalculations of spreadsheets with native and non-native functionality are optimized to reduce or minimize processing, then executed seamlessly. Analysis of the non-native functionality may be performed by a programming language interpreter which identifies user-defined variables, then traces the calculation according to the variables to determine an order for updating the non-native cells. In addition, the sequential execution of non-native functionality is supported by enforcing an order by which cell dependency can be determined. Thus, a user can quickly and easily code and execute Python programs in a spreadsheet in largely the same manner as one would in a development environment, thereby obviating the need to switch between the spreadsheet application and the development environment.

Turning now to the Figures, FIG. 1 illustrates operational scenario 100 for spreadsheet applications with integrated native and non-native functionality in an implementation. Operational scenario 100 includes computing device 110 and application service 120. Computing device 110 provides a local runtime environment for application service 120, while application service 120 hosts analysis engine 121 and dependency engine 122. Analysis engine 121 provides services for analyzing, interpreting, and executing non-native functionality of spreadsheets hosted by application service 120. Dependency engine 122 provides services for determining dependencies in spreadsheets hosted by application service 120. Computing device 110 displays user experience 111 (shown in various stages of operation as user experiences 111(a) and 111(b)) of application service 120. Workbook 113 is representative of spreadsheet workbooks opened in the context of the spreadsheet application on computing device 110 and displayed as spreadsheet 115 in user experience 111.

Computing device 110 is representative any computing device capable of running a spreadsheet application, examples of which include desktop and laptop computers, tablet computers, mobile phones, and the like. Examples of suitable spreadsheet applications include locally installed and executed applications, web-based applications that are executed in the context of a local web-browser application, and any variation or combination thereof. In some implementations, representative spreadsheet applications may be embedded in other applications and in accordance with numerous other frameworks including embedded frameworks and distributed frameworks.

Application service 120 provides one or more computing services, such as a spreadsheet application, to endpoints such as computing device 110. Application service 120 employs one or more server computers co-located or distributed across one or more data centers connected to computing device 110. Examples of such servers include web servers, application servers, virtual or physical servers, or any combination thereof. Computing device 110 communicates with application service 120 via one or more internets and intranets, the Internet, wired and wireless networks, local area networks (LANs), wide area networks (WANs), and any other type of network or combination thereof. Although computing device 110 and application service 120 are illustrated as remote from each other and on distributed devices in FIG. 1, it may be appreciated that they could be implemented in a co-located manner, and even on a single device.

Application service 120 hosts a spreadsheet application capable of hosting spreadsheets such as spreadsheet 115 and communicating with a resource such as analysis engine 121 and dependency engine 122 via an API or other integration mechanism. Although anticipated as services to application service 120, in various implementations, dependency engine 122 and/or analysis engine 121 are services or components of or integrated within application service 120. Workbook 113 of FIG. 1 is representative of a spreadsheet workbook that may be opened by the spreadsheet application and upon which the spreadsheet application and other components of application service 120 may perform operations.

In an operational example of the technology disclosed herein, computing device 110 renders user experience 111 including spreadsheet 115 of workbook 113 hosted by application service 120. User experience 111(a) displays spreadsheet 115 with cells which include native and non-native functionality. Native functionality includes functions, formula, and/or syntax which application service 120 interprets and executes; non-native functionality includes functions, formula, and/or syntax which analysis engine 121 can interpret and execute. For example, cell 116 contains a numerical value in a native format, while cells 117 each include a native function "PY." The arguments of the PY functions are non-native expressions (e.g., Python code) with inputs to be evaluated by analysis engine 121.

In user experience 111(b), a user engaged with user experience 111 enters user input 116(a) in cell 116 that changes the existing numerical value ("100") to a new value ("200"). When the user commits user input 116(a) to cell 116 (usually by hitting the character return key or "enter"), application service 120 updates spreadsheet 115 by identifying other cells which depend from the content of cell 116.

As used herein, the expression "A depends from B" includes a relationship that exists between cells A and B such that an aspect of A (e.g., the value of A) depends on or varies with an aspect of B (e.g., the value of B). Dependencies may be explicitly or implicitly defined.

To identify cells dependent on cell 116, dependency engine 122 of application service 120 identifies cells with non-native functionality (cells 117) based on the use of the "=PY( )" function and sends cells 117 to analysis engine 121 to identify dependencies among or between those cells. Analysis engine 121 receives the non-native arguments of the PY functions of cells 117 and interprets the Python code of the non-native arguments to identify the (non-native) dependencies, then translates those dependencies into a native format interpretable by dependency engine 122 and application service 120. In determining the dependencies, cells 117 are executed or interpreted according to a row-major order which governs the sequence in which the lines of code are executed. The dependencies of cells 117 are determined according to metadata provided to analysis engine 121 with each of the PY arguments, such as cell references or addresses for each of the arguments or lines of code. Analysis engine 121 then translates the identified dependencies to a native format according to the metadata and returns the translated dependencies to dependency engine 122.

Dependency engine 122 receives the translated dependencies of cells 117 from analysis engine 121. Dependency engine 122 also identifies originally native dependencies, i.e., dependencies between cells with native functionality, and native dependencies from non-native arguments with explicit cell references. Dependency engine 122 then determines a scope of recalculating spreadsheet 115 including the cells to be updated based on the dependencies. The dependencies identified among cells 116 and 117 are illustrated as arrows in user experience 111(b). The dependencies may be explicit or implicit: a dependency is explicit when the one cell explicitly references another cell (e.g., includes the address of another cell), while implicit dependency arises when a cell value or variable changes based on a change to another cell.

Continuing the illustrated example, to update spreadsheet 115, application service 120 executes the functionality of the dependent cells in an order of based on the functionality of the cells and the applicable ordering scheme. To update cells 117, application service 120 sends the non-native arguments of the PY functions to analysis engine 121 along with inputs from native cells, such as cell 116, for evaluating the non-native expressions. Analysis engine 121 executes the lines of code and returns the results in accordance with the PY function calls to application service 120. Application service 120 then updates spreadsheet 115 with the new values.

Figure 2:
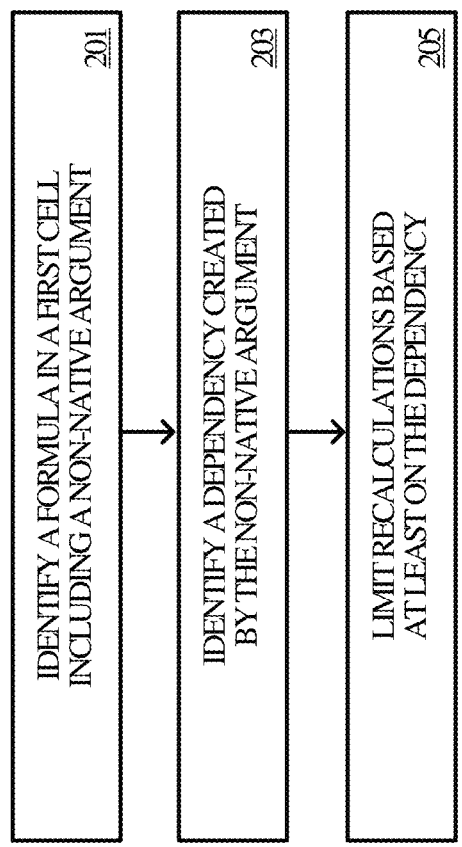
FIG. 2 illustrates a process for integrating native and non-native dependencies in an implementation.
Figure 7:
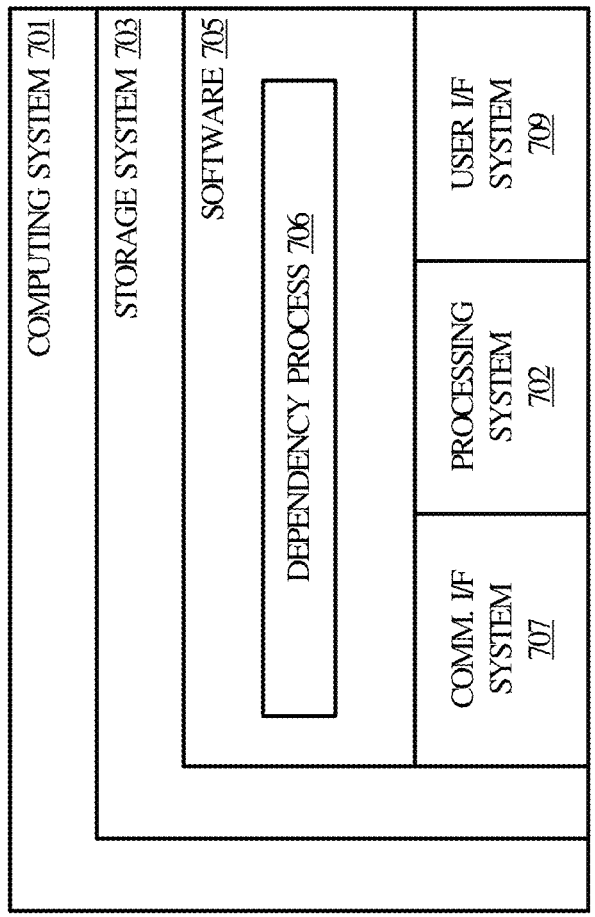
FIG. 7 illustrates a computing system suitable for implementing the various operational environments, architectures, processes, scenarios, and sequences discussed below with respect to the other Figures.

FIG. 2 illustrates process 200 of operating for integrating native and non-native functionality in a spreadsheet on a suitable computing device, of which computing device 701 of FIG. 7 is representative. Process 200 is implemented in program instructions in the context of a software application, such as an application hosted by application service 120 of FIG. 1 or spreadsheet application 301 of FIG. 3. The program instructions direct the computing device to operate as follows, referring parenthetically to the steps in FIG. 2.

The computing device identifies a formula in a first cell which includes a non-native argument (step 201). In an implementation, the computing device receives a change to the content of a cell in a spreadsheet, for example, by a user entering or replacing a value or a formula. Receiving the change triggers a recalculation of the spreadsheet, the scope of which is based on explicit and implicit dependencies to the changed cell. Upon receiving the change, the computing device identifies a formula in the first cell which includes a non-native argument, i.e., an expression which is not defined in the application or which the application cannot interpret or execute. In some implementations, the formula is a native formula which causes the computing device to send the non-native argument to an external service for evaluation or analysis.

The computing device identifies a dependency created by the non-native argument between the first cell and a second cell (step 203). In an implementation, the computing device identifies the dependency by parsing the non-native argument of the first cell for an explicit reference or address to the second cell or by interpreting the relationship between the first cell and the second cell, such as determining that the output of the second cell is an input to the first cell. In some implementations, dependencies are identified and registered in a dependency list, table, or other data structure when a cell is filled or changed. For example, the dependency table may include parent cells and child cells which depend from each of the parent cells. Thus, the computing device may identify a dependency between the first and second cell by consulting a dependency table or list for cells which depend from the first cell. When the dependency is identified, the computing device may translate the dependency to a native format, such as in terms of cell references or addresses. In some implementations, the dependency is identified an external service or engine which is operatively coupled to the computing device and which can interpret and execute the non-native argument.

The computing device limits the recalculations based at least on the dependency (step 205). In an implementation, the computing device receives the cell reference or address of the non-native dependency and, together with other dependencies identified based on the change, identifies a scope of the recalculation. By limiting the recalculation based on the identified dependency or dependencies, the process of updating the spreadsheet is computationally less expensive and more efficient than performing a global recalculation (i.e., updating all occupied cells) of the spreadsheet.

In various implementations, the computing device updates the cells based on the dependencies. The cells are updated by recalculating the cells, where recalculation can include executing a function natively or sending a non-native expression to an external resource for evaluation. As cells are updated, other downstream dependencies can include updating a data chart or data table based on the updated cell values.

Figure 3:
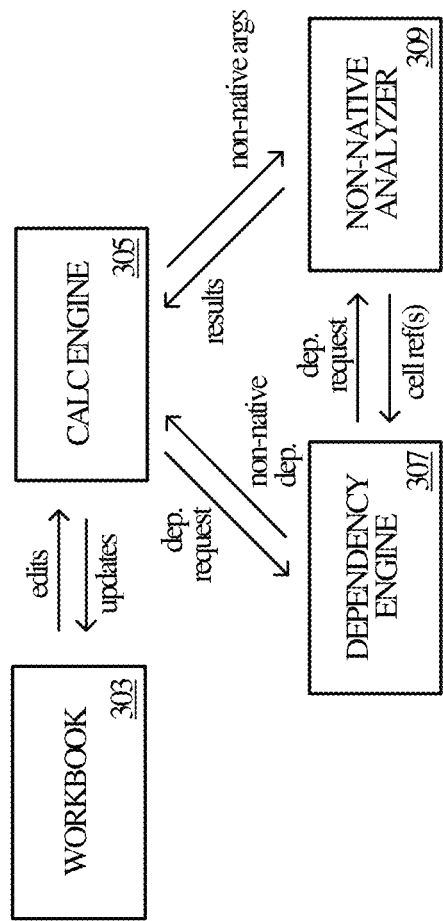
FIG. 3 illustrates a systems architecture for integrating native and non-native dependencies in an implementation.

FIG. 3 illustrates systems architecture 300 in an implementation, which is representative of a software architecture that may be employed to provide the enhanced integration for spreadsheets disclosed herein. Systems architecture 300 may be implemented as a cloud-based application service or locally on a user computing device. In some implementations, systems architecture 300 is implemented as a distributed architecture across remote servers and a user computing device. For example, in the context of operational environment 100 in FIG. 1, systems architecture 300 may be implemented in the context of application service 120, on computing device 110, or distributed across both. Systems architecture 300 includes workbook 303, calc engine 305, dependency engine 307, and non-native analyzer 309.

Calc engine 305 is representative of a service capable of hosting spreadsheets such as workbook 303 and communicating with dependency engine 307 and non-native analyzer 309. In systems architecture 300, calc engine 305 hosts workbook 303 in an application environment on a user computing device (not shown). Calc engine 305 may execute on a server-based architecture, locally on a user computing device, or as a distributed architecture across client and server. Calc engine 305 is operatively or communicatively coupled to dependency engine 307 and non-native analyzer 309. For example, calc engine 305 may request and receive dependency analysis for portions of workbook 303 from dependency engine 305. Likewise, calc engine 305 may call non-native analysis 309 via an API to evaluate non-native arguments from workbook 303 or to request and receive analysis of non-native dependencies among non-native arguments from workbook 303.

Dependency engine 307 is representative of a software component, module, or application capable of synthesizing a scope of recalculation based on dependencies, such as dependencies received from non-native analyzer 309 or other services of calc engine 305. Dependency engine 307 may communicate with non-native analyzer 309 via an API. Non-native analyzer 309 is representative of a software component, module, or application capable of interpreting, analyzing, and executing procedural code of a programming language, such as Python or Java. Examples of non-native analyzer 309 include Python or Java runtime engines. Workbook 303 is representative of a spreadsheet workbook including workbook data upon which calc engine 305 performs various operations such as spreadsheet recalculations.

In a brief example of an operational scenario, a user edits cells in a spreadsheet of workbook 303 with integrated functionality, such as by entering or editing the spreadsheet in a spreadsheet environment executing on a user computing device. The edits can include changing the content of a cell to a value or a formula to be evaluated. Workbook 303 transmits the edits to calc engine 305 which implements the edits to update the spreadsheet. In the process of implementing the edits, calc engine 305 interacts with both dependency engine 307 and non-native analyzer 309 to identify cells which are to be recalculated based on the edits (i.e., the scope of the recalculation) and to process the edits to update the spreadsheet.

Calc engine 305 maintains a dependency registry (not shown) for identifying the "child" cells of a given cell of workbook 303, that is, cells which depend directly or indirectly from the given cell. When the given cell is changed, calc engine 305 consults the registry to identify dependent cells which are to be updated in response to the change.

Calc engine 305 interacts with dependency engine 307 to receive dependency information for cells in workbook 303. When dependency engine 307 receives a request from calc engine 305 for a dependency analysis for a given (changed) cell, dependency engine 307 parses the non-native argument of the cell to identify cells from which the output of the given cell depends (i.e., the parent cells of the given cell). Dependency engine 307 sends the dependency information to calc engine 305 to update the registry so that if/when a parent cell of the given cell is changed, the given cell is included in the recalculation triggered by the change. The dependencies identified by dependency engine 307 include native dependencies (e.g., a cell address in the non-native argument) and non-native dependencies identified by non-native analyzer 309. Together, the native and non-native dependencies for cells in workbook 303 form a set of integrated dependencies.

Non-native analyzer 309 interacts with dependency engine 307 to identify dependencies in the non-native syntax. Dependency engine 307 transmits to non-native analyzer 309 a request for the dependencies of cells in workbook 303. Non-native analyzer 309 identifies dependencies between non-native arguments in cells of workbook 303, then translates the dependencies into cell references or addresses. The translated dependencies in terms of cell references are returned to dependency engine 307 for inclusion in the integrated dependencies.

Calc engine 305 may also interact with non-native analyzer 309 when workbook 303 is recalculated. For example, if a cell in the scope of the recalculation includes a non-native argument, calc engine 305 sends the non-native argument, along with metadata for the cell, to non-native analyzer 309 for evaluation. Non-native analyzer 309 returns the results of evaluating the non-native arguments to calc engine 305 to complete the recalculation.

Figure 4A:
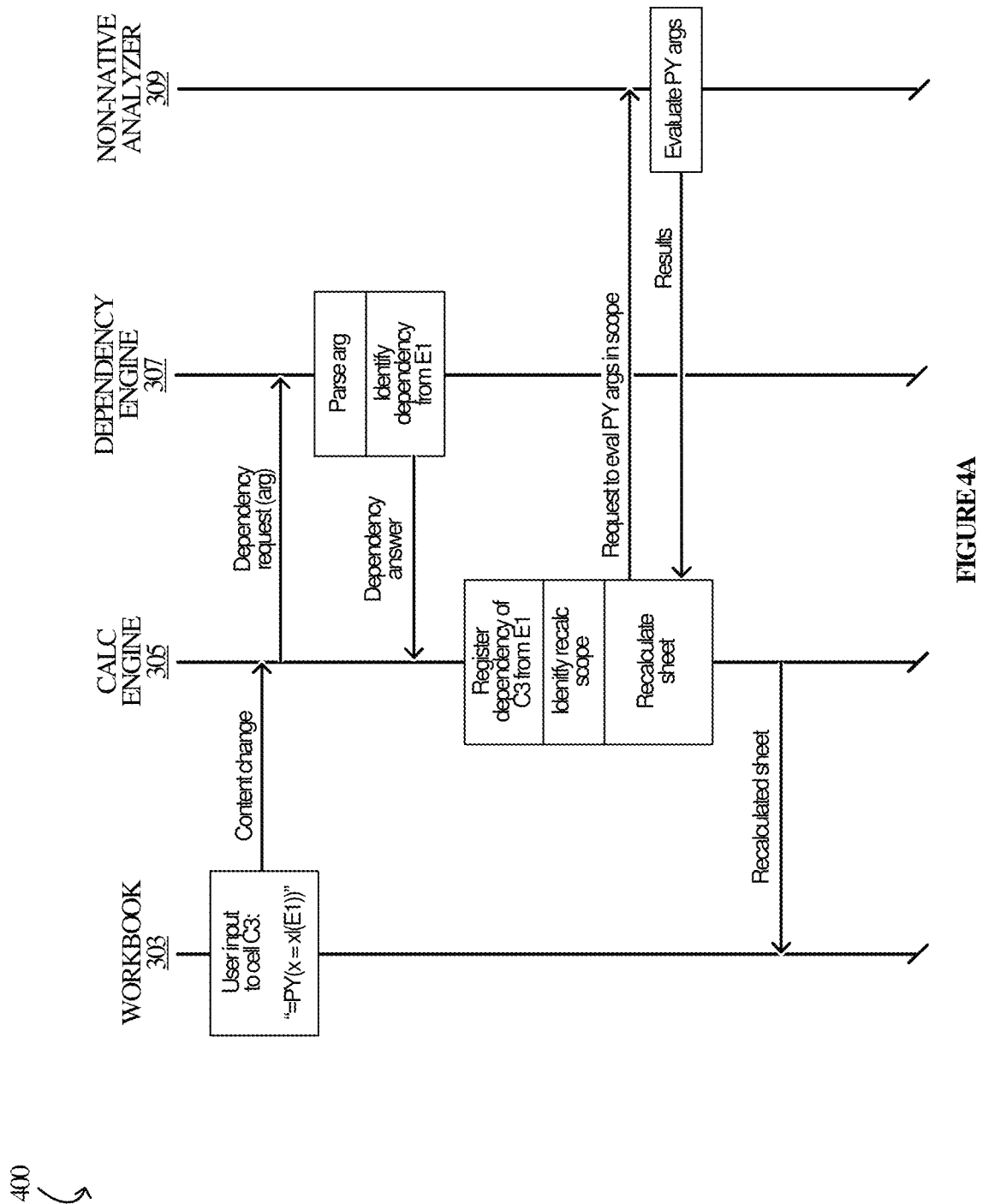
FIGS. 4A-4C illustrate an operational scenario for integrating native and non-native dependencies in an implementation.
Figure 4B:
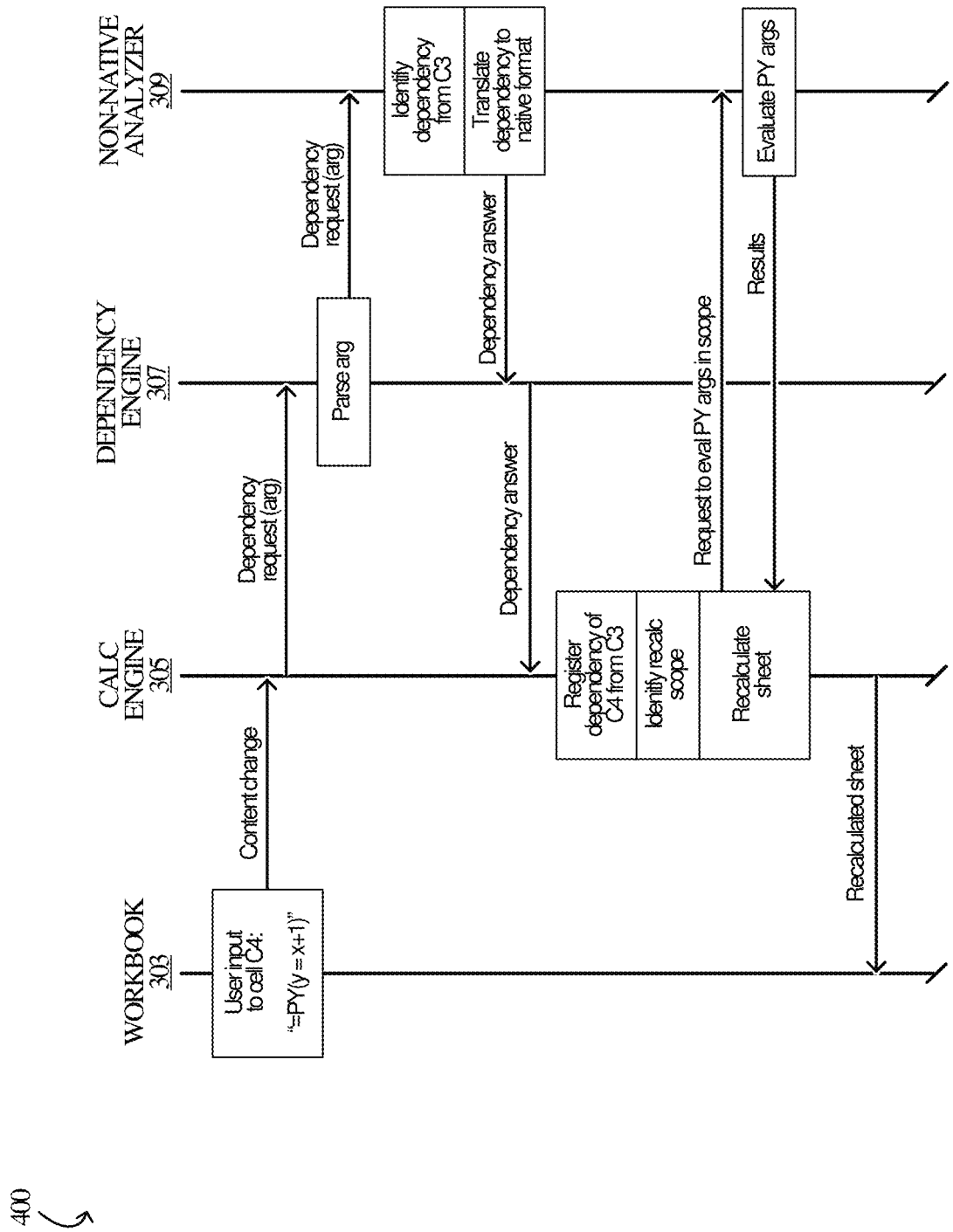
Figure 4C:
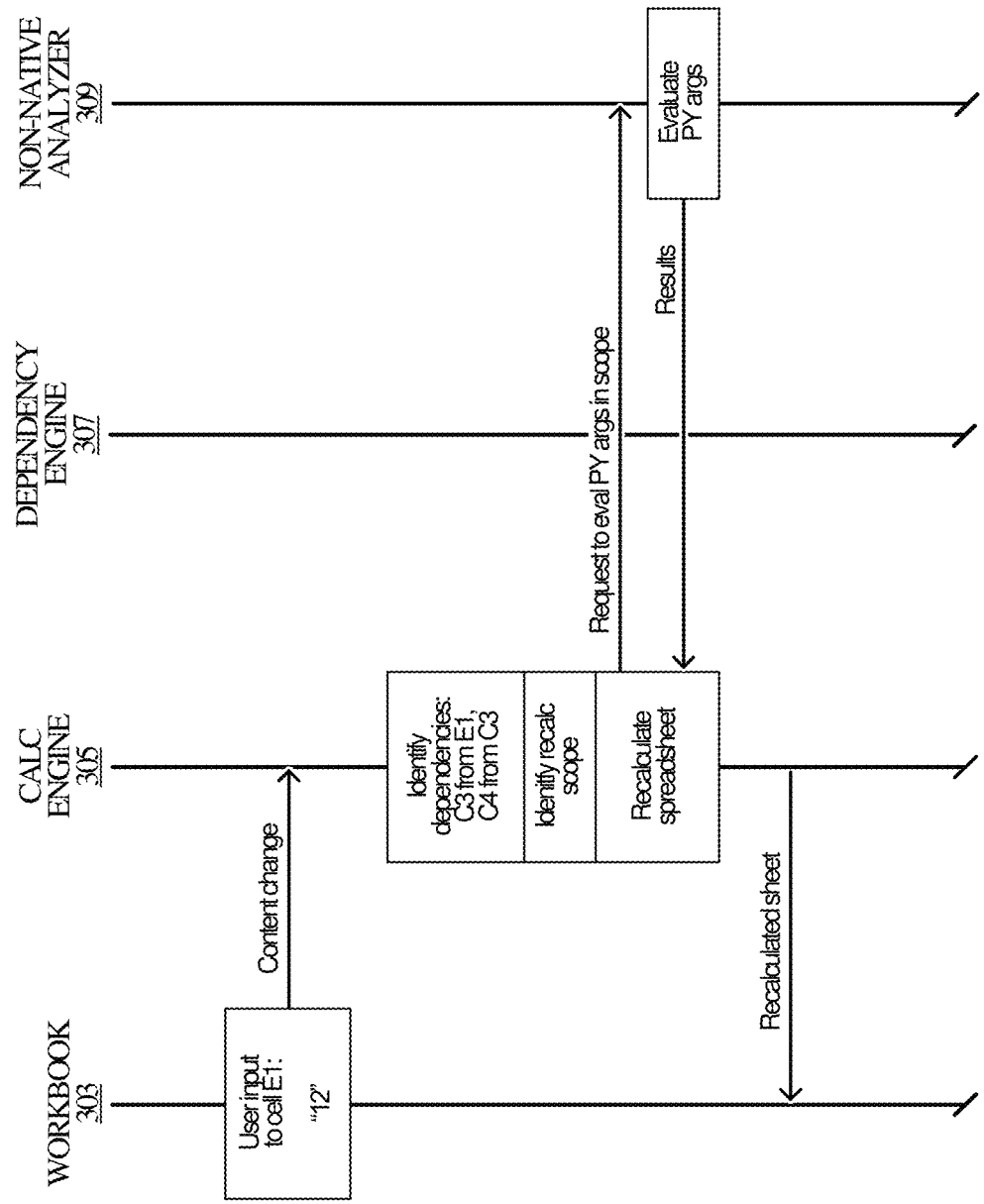

FIGS. 4A-4C illustrate operational scenario 400 that is representative of an implementation of process 200, referring to the elements of systems architecture 300 for purposes of clarity. In FIG. 4A, workbook 303 receives user input which changes the content of cell C3 of a spreadsheet to include a Python formula: "=PY(x=xl(E1))" with the non-native Python argument "x=xl(E1)." Entering the Python formula triggers a recalculation of workbook 303, the scope of which is to be determined. The formula is sent to calc engine 305 which determines that the updated content includes a non-native argument. Calc engine 305 sends a request to dependency engine 307 for dependencies relating to the Python argument.

Dependency engine 307 receives the request from calc engine 305 for dependency information relating to the Python argument and parses the Python argument to identify whether any explicit or implicit dependencies exist. As illustrated in FIG. 4A, the Python argument of cell C3 includes an explicit reference to cell E1. Dependency engine 307 returns the discovered dependency to calc engine 305 which registers the dependency in a dependency registry (not shown) for subsequent calculations. The dependency registry includes dependencies for occupied cells in workbook 303. Calc engine 305 updates the registry as dependencies are created or destroyed.

Next, calc engine 305 identifies a scope of recalculation including cells which depend directly or indirectly from cell C3 identified in the dependency registry. Calc engine 305 then updates or recalculates the cells within the scope and transmits the updated cell data or spreadsheet data to workbook 303. To update cells depending from cell C3 which include Python arguments, calc engine 305 sends a request to non-native analyzer 309 to evaluate the Python arguments and return the results to complete the recalculation.

Continuing operational scenario 400 in FIG. 4B, workbook 303 receives another user input, this time including a new or updated content for cell C4. The newly supplied content for cell C4 is another PY function with the non-native Python argument "y=x+1." Workbook 303 transmits the new cell content to calc engine 305 which determines that the new content includes a non-native argument. Calc engine 305 sends another request to dependency engine 307 for a dependency analysis relating to the Python argument.

Upon receiving the Python argument from calc engine 305, dependency engine 307 parses the argument for any explicit cell references and finds none. Dependency engine 307 also sends a request to non-native analyzer 309 to identify any dependencies in the Python expression of the argument. In the request, dependency engine 307 may include metadata associated with the cell which contains the argument, such as an indication of the order in which the Python argument is invoked relative to other Python arguments in workbook 303 or a cell address for the argument. Non-native analyzer 309 receives the Python argument and identifies a dependency in the argument: Python variable y depends from Python variable x. Non-native analyzer 309 translates the identified dependency to a native format based on the metadata in the request: cell C4 depends from cell C3. Non-native analyzer 309 returns the translated dependency to dependency engine 307 which in turn sends the translated dependency to calc engine 305 for inclusion in the dependency registry.

Next, calc engine 305 identifies a scope of recalculation based on dependencies to cell C4 from among the registered dependencies identified in the dependency registry. The scope of recalculation may include Python arguments of other cells which depend explicitly or implicitly from the output of changed cell C4. In operational scenario 400, the Python arguments depending explicitly or implicitly from cell C4 are sent by calc engine 305 to non-native analyzer 309 for evaluation. Non-native analyzer 309 evaluates the non-native arguments and returns the results to calc engine 305. Calc engine updates or recalculates the cells including the results received from non-native analyzer 309 and transmits the updated cell data or spreadsheet data to workbook 303.

Continuing operational scenario 400 in FIG. 4C, workbook 303 receives a third user input which supplies a content change for cell E1. Workbook 303 propagates the change to calc engine 305. Calc engine 305 recognizes the native syntax of the content change and identifies dependencies from cell E1 by consulting the dependency registry. As illustrated, calc engine 305 identifies that cell C3 depends directly from E1 and cell C4 depends indirectly from E1 (based on its direct dependence from C3). Thus, the scope of the recalculation includes at least cells C3 and C4. Notably, calc engine 305 does not request dependency information from dependency engine 307 because the content change does not include a non-native expression.

Calc engine 305 proceeds with recalculating the spreadsheet of workbook 303, updating only the cells within the scope of the recalculation. With the spreadsheet recalculated, calc engine 305 sends the updated spreadsheet data to workbook 303.

FIGS. 5A-5D illustrate operational scenario 500 of the technology for integrated native and non-native functionality in spreadsheets disclosed herein. In operational scenario 500, spreadsheet 515 (shown in various stages of operation as spreadsheets 515(a)-515(h)) is hosted by a spreadsheet application. Spreadsheet 515 includes cells with native and non-native functionality. In column B of spreadsheet 515, cells B2 through B8 display cell values resulting from the execution of a formula in each cell. For the purpose of illustration, the formulas of column B cells are displayed in adjacent cells in column C of spreadsheet 515.

Figure 5A:
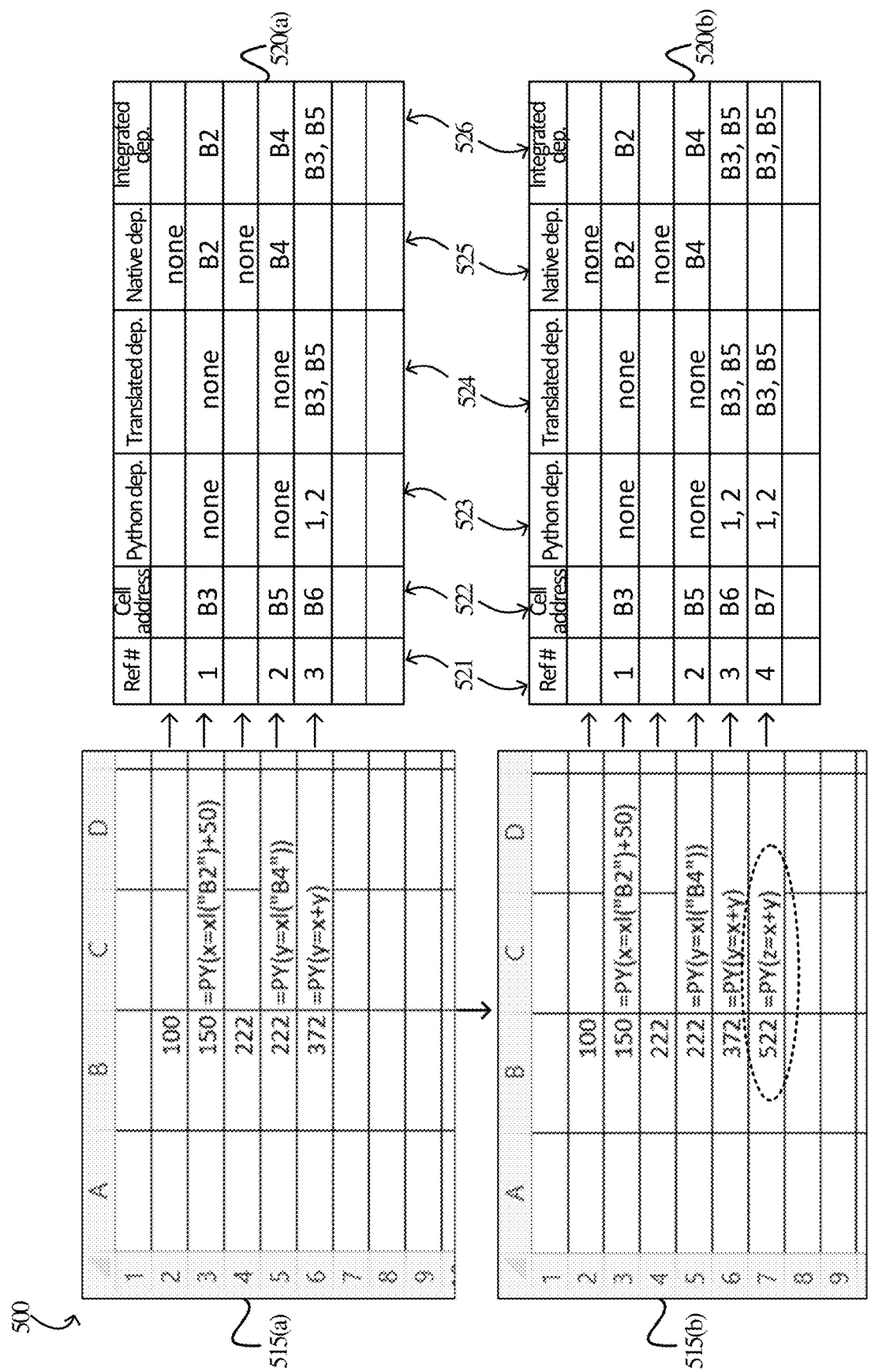
FIGS. 5A-5D illustrate an operational scenario for integrating native and non-native dependencies in an implementation.

In spreadsheet 515(a) of FIG. 5A, cells B2 and B4 include native functionality, while cells B3, B5, and B6 include non-native functionality, specifically, Python code. The Python code may be identified or distinguished from native spreadsheet functionalities by virtue of being enclosed within a function defined within the spreadsheet application, e.g., spreadsheet function PY( ). The PY function causes the spreadsheet application to call a Python code engine to analyze or execute the argument of the PY function. When the spreadsheet application encounters non-native procedural language in the process of updating a spreadsheet, the spreadsheet application delegates the processing of that language to the code engine which interprets and executes the code. When the spreadsheet application encounters native functionality (e.g., a function defined in the spreadsheet application), the spreadsheet application itself interprets and executes the functions.

Output from evaluating the cells passes between the cells in spreadsheet 515 according to dependencies between the cells. Dependencies include direct dependencies (e.g., those which explicitly reference a cell) and indirect dependencies (e.g., those which implicitly reference a cell through a dependency on one or more intermediary cells). For example, of the non-native arguments in spreadsheet 515, cell B3 depends directly from cell B2 according to the external reference operation "xl("B2")" and cell B5 similarly depends directly from cell B4. Cell B6 depends directly from cells B3 and B5 and thus indirectly from cells B2 and B4.

Tables 520(a)-520(h) illustrate the dependency analyses which are performed for the occupied cells in column B of spreadsheets 515(a)-515(h), respectively, including dependencies arising from native and non-native functionality. In tables 520, column 521 lists the order of the Python arguments of the PY functions according to a row-major ordering. Column 522 illustrates cell addresses mapped to or associated with the Python arguments. The cell addresses are included in metadata supplied to a code engine with the respective Python arguments.

The code engine executing in conjunction or as a service of the spreadsheet application identifies dependencies among the non-native arguments of spreadsheet 515. Column 523 lists "parent" argument(s) from which each "child" argument or cell depends. For example, as indicated in tables 520, child cell B6 depends from parent arguments 1 and 2 corresponding to parent cells B3 and B5. With parent-child dependencies identified from the Python arguments, the code engine translates the dependencies to a format native to the spreadsheet application. Column 524 illustrates the parent arguments translated or mapped to the cell addresses of those arguments.

Column 525 of tables 520 illustrates the native dependencies identified by the spreadsheet application for cells with native functionality. As illustrated in tables 520, cell B3 has a native dependency from cell B2 and cell B5 from cell B4. With translated dependencies and native dependencies identified, the spreadsheet application integrates the dependencies, as illustrated in column 526.

In some implementations, various ones of the dependencies illustrated in tables 520 are stored in a dependency registry or datastore (e.g., look-up table or list) which the spreadsheet application or a calc engine of the spreadsheet application consults to determine a scope of recalculation. For example, the datastore may include the integrated dependencies as illustrated in column 526, where parent cells are identified for each of the child cells. Alternatively, the datastore may store the dependencies such that child cells are identified for each of the parent cells. In either case, the spreadsheet application can consult the datastore to identify a set of cells which depend directly or indirectly from a changed cell to identify the scope of recalculation. By limiting the scope to the cells identified according to the dependencies emanating from a changed cell, the recalculation is limited to updating only those cells which may be out-of-date with respect to the change.

Continuing with FIG. 5A, in spreadsheet 515(b) of operational scenario 500, a user enters a formula including a PY function in cell B7. The spreadsheet application determines that cell B7 includes a non-native argument ("z=x+y"). From the non-native argument, the code engine identifies dependencies for newly updated cell B7 from parent arguments 1 and 2 corresponding to parent cells B3 and B5. The spreadsheet application updates the integrated dependencies to include the dependencies for cell B7.

Figure 5B:
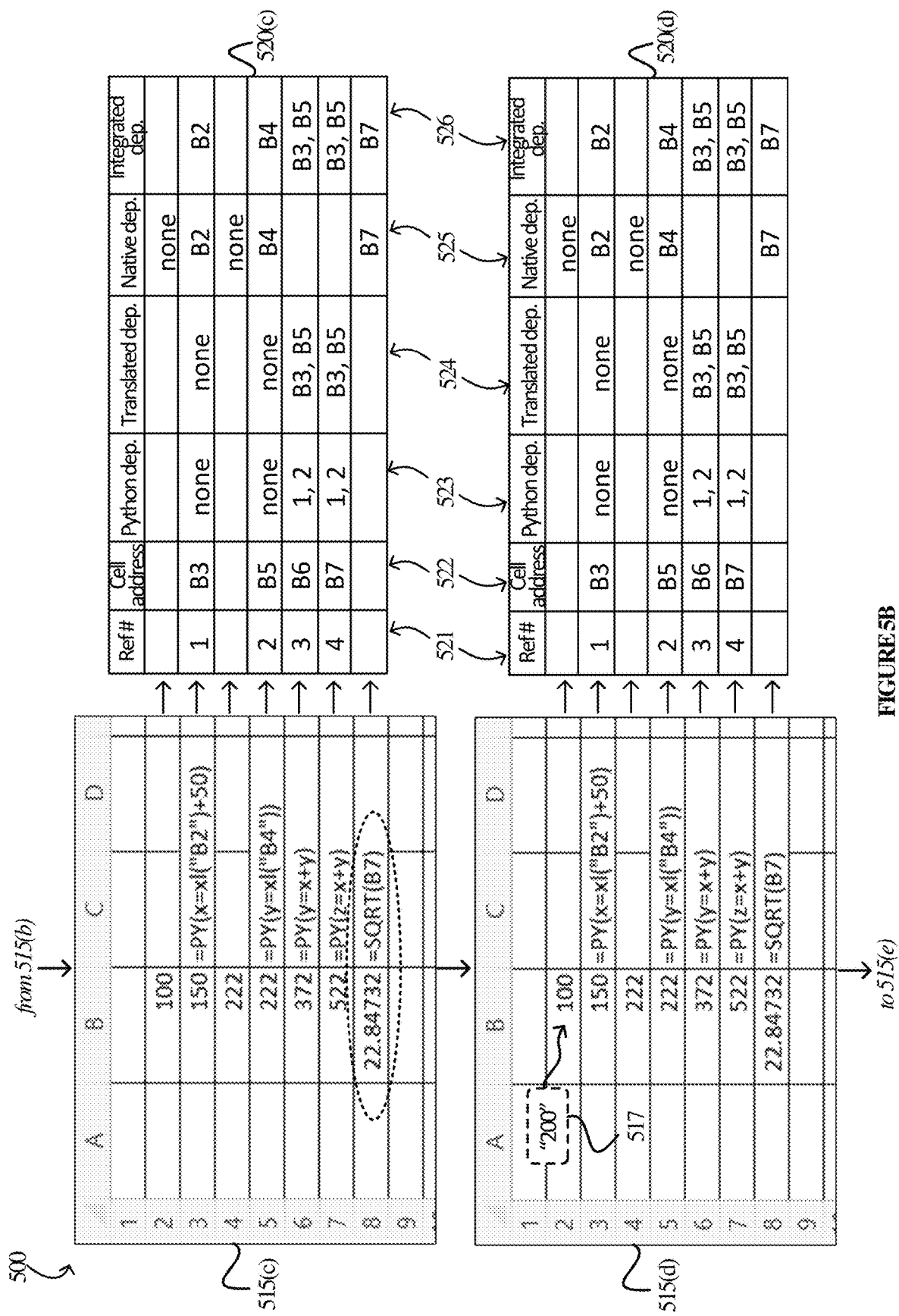

Continuing to FIG. 5B, in spreadsheet 515(*c*), the user enters a formula in cell B8. The formula entered in cell B8 is purely native expression, that is to say, an expression which the spreadsheet application can understand and execute. The spreadsheet application determines that cell B8 has a native dependency from cell B7, as illustrated in column 525 of table 520(*c*). The spreadsheet application updates the integrated dependencies to include the dependency for cell B8.

Continuing to spreadsheet 515(*d*), the user enters and commits change 517 to the content of cell B2 which triggers a recalculation of cells in spreadsheet 515. To perform a minimal number of recalculations or cell updates based on change 517, the spreadsheet application determines the scope of the recalculation such that recalculation is limited to the cells whose values are out-of-date with respect to changed cell B2. The application service hosting spreadsheet 515 receives information relating to change 517 and parses spreadsheet 515 to identify dependencies according to which the scope of the recalculation will be determined.

In operation, when a change to the contents of a cell occurs, the application service identifies a scope of recalculation for spreadsheet 515 based on dependencies determined from the contents of the occupied cells. When the application service identifies a cell that is out-of-date due to the change, the application service marks, "dirties," or otherwise generates an indication with respect to the cell to indicate that the value must be recalculated in response to the change.

In spreadsheet 515(*d*), the spreadsheet application determines which cells are to be updated based on change 517 according to the integrated dependencies as illustrated in column 526 of Table 520(*d*). For example, according to the integrated dependencies, cell B3 depends from cell B2. No other cells depend directly from cell B2. However, cells B6 and B7 depend from cell B3 (and thus indirectly from cell B2), and cell B8 depends from cell B7. Thus, the scope of the recalculation of spreadsheet 515 is limited to out-of-date cells (B3, B6, B7, and B8), while the other cells which are not dependent on change 517 are left untouched. The scope of the recalculation based on change 517 is illustrated by shading in spreadsheet 515(*e*) and table 520(*e*) of FIG. 5C.

Figure 5C:
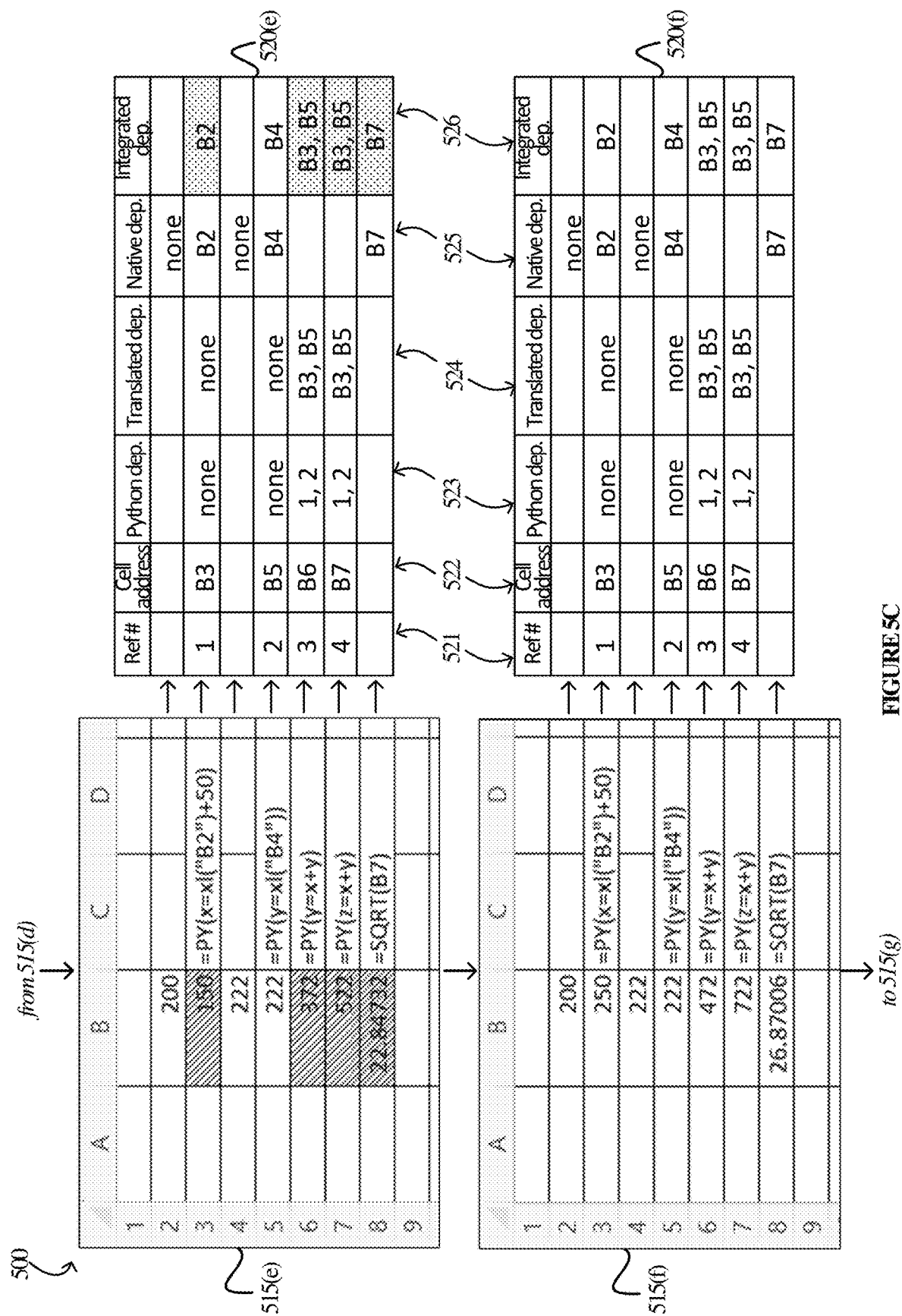

With the scope of recalculation determined, the spreadsheet application or a calc engine of the spreadsheet application executes the recalculation. To process the non-native cells, the application service sends the formulas of the non-native cells to the code engine which interprets or evaluates the non-native Python arguments. For arguments with explicit references to spreadsheet cells (e.g., cells B2 and B4), the code engine obtains the cell values from the spreadsheet application as the code is executed. The code engine returns the output to the spreadsheet application or calc engine. Upon receiving the updated values, the spreadsheet application updates the out-of-date cells accordingly. Spreadsheet 515(*f*) in FIG. 5C illustrates the now-updated cells.

Figure 5D:
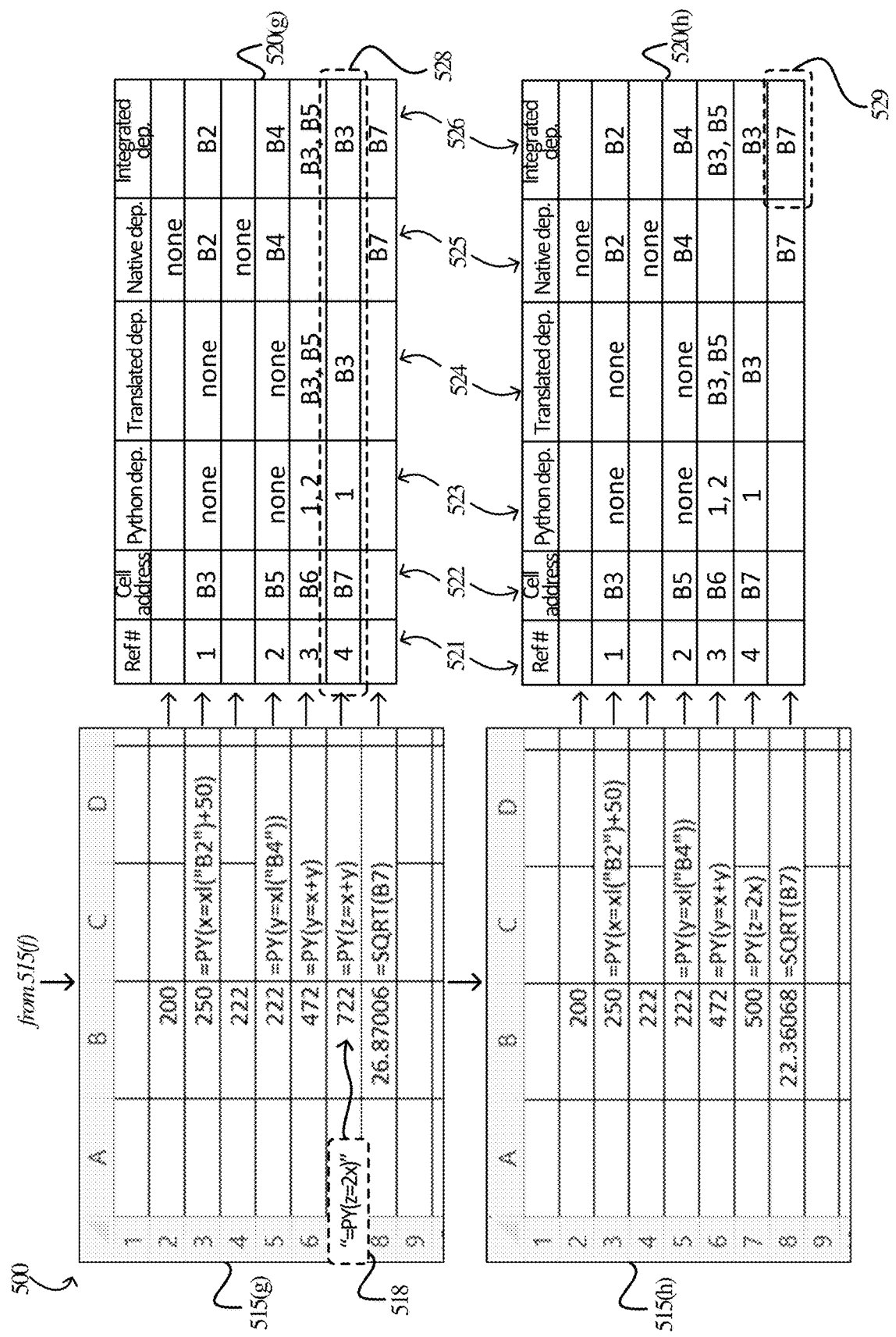

Continuing operational scenario 500 in FIG. 5D, in spreadsheet 515(*g*), the user commits change 518 to cell B7 which includes revising the Python expression in the PY function of the cell. When the spreadsheet application receives change 518, the application determines whether and which dependencies of the dependencies illustrated in table 520(*g*) must be updated. Because cell B7 post-change includes a non-native expression ("z=2x"), the spreadsheet application transmits the expression to the code engine to determine any dependencies within it. As illustrated in row 528 of table 520(*g*), the code engine identifies that cell B7 now depends only from parent 1 or parent cell B3. The integrated dependencies, as illustrated in column 526 of table 520(*g*), are updated accordingly.

To update spreadsheet 515 in response to change 518, the spreadsheet application consults the dependency registry to determine a scope of recalculation resulting from change 518. According to dependency 529 in table 520(*h*), because cell B8 is the only cell that depends from cell B7, B8 is the only cell in the scope of the recalculation. Spreadsheet 515(*h*) illustrates the state of spreadsheet 515 subsequent to the user inputs and recalculations.

Figure 6A:
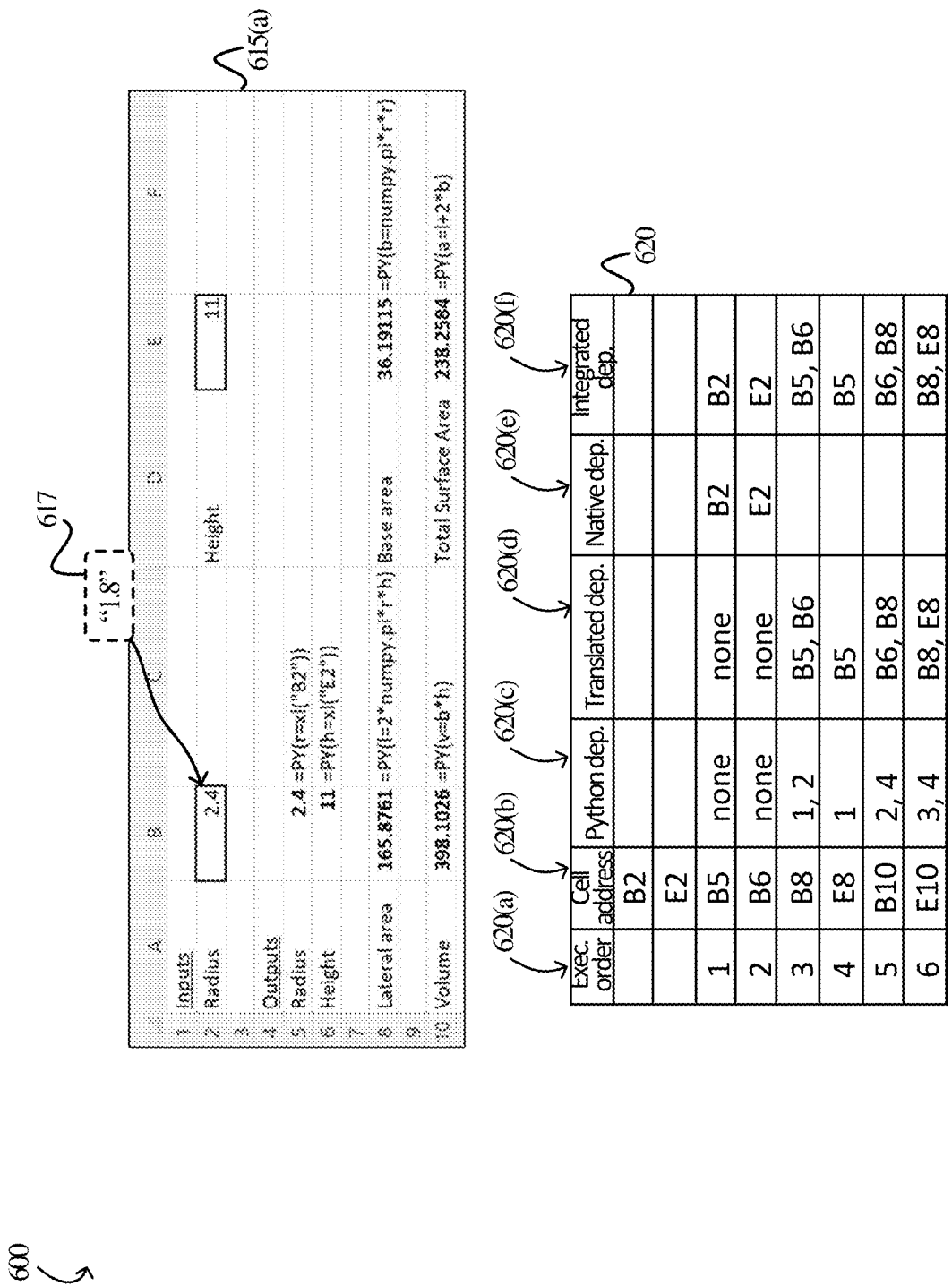
Figure 6B:
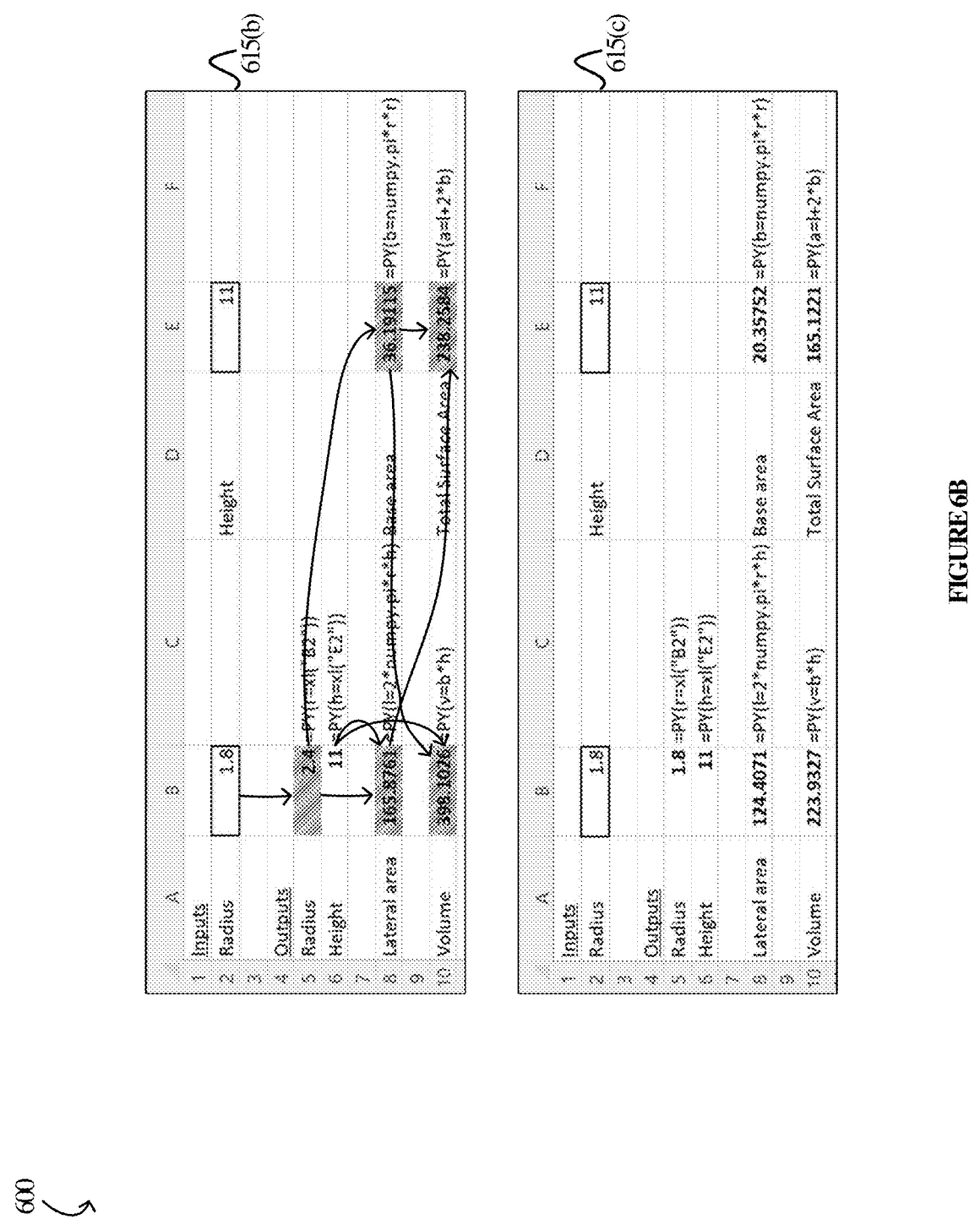

Turning now to FIGS. 6A and 6B illustrate operational scenario 600 for enhanced integration of spreadsheets based on the technology disclosed herein. In operational scenario 600, spreadsheet 615 (shown in various stages of operation as spreadsheets 615(*a*), 615(*b*), and 615(*c*)) is hosted by a spreadsheet application of an application service of which application service 120 in FIG. 1 is representative. Spreadsheet 615 includes cells with native and non-native functionality. Beginning with spreadsheet 615(*a*), cells B5, B6, B8, B10, E8, and E10 display cell values resulting from the execution of a Python argument in each cell based on user-supplied input values in cells B2 and E2. For the purpose of illustration, the formulas of cells of columns B and E are displayed in adjacent cells in columns C and F of spreadsheet 615.

In operation, when a change to the contents of a cell occurs, the spreadsheet application identifies a scope of recalculation for spreadsheet 615 based on dependencies determined from the contents of the occupied cells. When the application service identifies a cell that is out-of-date due to the change, the application service marks, "dirties," or otherwise generates an indication with respect to the cell to indicate that the value must be recalculated in response to the change.

As illustrated in spreadsheet 615(*a*), the user changes the value of cell B2 to 1.8 from 2.4. The spreadsheet application receives change 617 to cell B2 and parses spreadsheet 615 to identify dependencies. To perform a minimal number of recalculations or cell updates based on change 617, the spreadsheet application determines the scope of the recalculation such that recalculation is limited to the cells whose values are out-of-date with respect to the changed cell.

For cells which include non-native arguments, a code engine of the spreadsheet application determines the dependencies between the Python arguments, then translates those dependencies into a native format for use by a dependency engine of the spreadsheet application. In determining the dependencies between the cells with Python arguments, the code engine interprets the lines of code according to a row-major order of the cells which contain Python code, so that the lines of code are interpreted or executed sequentially from top to bottom. Thus, for spreadsheets with more than one cell containing non-native code in a row, the code engine processes the operations row-by-row, for example, A1, B1, C1, A2, B2, C2, A3, and so on.

As illustrated in spreadsheet 615(*a*), the user commits change 617 to the content of cell B2. The spreadsheet application hosting spreadsheet 615 receives information relating to change 617 and parses spreadsheet 615 to identify dependencies. Table 620 illustrates steps of a dependency analysis performed on spreadsheet 615, including dependencies arising from native and non-native functionality. In table 620, column 620(a) lists the execution order of non-native arguments of the Python function calls according to row-major ordering. Column 620(b) illustrates cell addresses mapped to or associated with the non-native arguments. The cell addresses are included in metadata supplied to a code engine with the respective non-native arguments.

The code engine executing in conjunction or as a service of the spreadsheet application identifies dependencies among the non-native arguments of spreadsheet 615. Column 620(c) lists "parent" argument(s) from which each "child" argument or cell depends. For example, child cell B8 depends from parent arguments 1 and 2 corresponding to parent cells B5 and B6. With parent-child dependencies identified from the Python arguments, the code engine translates the dependencies to format native to the spreadsheet application. Column 620(d) illustrates the parent arguments translated or mapped to the cell addresses of those arguments.

Column 620(e) illustrates the native dependencies identified by the spreadsheet application for cells with native functionality. As illustrated, cell B5 has a native dependency from cell B2 by virtue of an explicit reference to cell B2 in the Python argument, and cell B6 has a similar native dependency from cell E2. With translated dependencies and native dependencies identified, the spreadsheet application integrates the dependencies, as illustrated in column 620(f).

With the integrated dependencies identified (as illustrated by arrows in spreadsheet 615(b)), the spreadsheet application determines which cells are to be updated based on change 617 (as illustrated by shading in spreadsheet 615(b)). Thus, the scope of the recalculation of spreadsheet 615 is limited to the out-of-date cells, while the other cells which are not dependent on change 617 are left untouched.

As the recalculation is executed, the spreadsheet application or calc engine of the spreadsheet application sends the out-of-date non-native arguments of spreadsheet 615 to the code engine to process the non-native arguments. For example, for cell B8, the code engine computes a value of 1 (i.e., lateral area) and returns the output to the spreadsheet application in response to the PY function call of that cell. For cell E10, the code engine computes a value of a (i.e., total surface area) and returns the output to the spreadsheet application in response to the PY function call of that cell. The state of spreadsheet 615 after recalculation is illustrated in spreadsheet 615(c).

FIG. 7 illustrates computing device 701 that is representative of any system or collection of systems in which the various processes, programs, services, and scenarios disclosed herein may be implemented. Examples of computing device 701 include, but are not limited to, desktop and laptop computers, tablet computers, mobile computers, and wearable devices. Examples may also include server computers, web servers, cloud computing platforms, and data center equipment, as well as any other type of physical or virtual server machine, container, and any variation or combination thereof.

Computing device 701 may be implemented as a single apparatus, system, or device or may be implemented in a distributed manner as multiple apparatuses, systems, or devices. Computing device 701 includes, but is not limited to, processing system 702, storage system 703, software 705, communication interface system 707, and user interface system 709 (optional). Processing system 702 is operatively coupled with storage system 703, communication interface system 707, and user interface system 709.

Processing system 702 loads and executes software 705 from storage system 703. Software 705 includes and implements dependency process 706, which is (are) representative of the dependency processes discussed with respect to the preceding Figures, such as process 200. When executed by processing system 702, software 705 directs processing system 702 to operate as described herein for at least the various processes, operational scenarios, and sequences discussed in the foregoing implementations. Computing device 701 may optionally include additional devices, features, or functionality not discussed for purposes of brevity.

Referring still to FIG. 7, processing system 702 may comprise a micro-processor and other circuitry that retrieves and executes software 705 from storage system 703. Processing system 702 may be implemented within a single processing device but may also be distributed across multiple processing devices or sub-systems that cooperate in executing program instructions. Examples of processing system 702 include general purpose central processing units, graphical processing units, application specific processors, and logic devices, as well as any other type of processing device, combinations, or variations thereof.

Storage system 703 may comprise any computer readable storage media readable by processing system 702 and capable of storing software 705. Storage system 703 may include volatile and nonvolatile, removable and non-removable media implemented in any method or technology for storage of information, such as computer readable instructions, data structures, program modules, or other data. Examples of storage media include random access memory, read only memory, magnetic disks, optical disks, flash memory, virtual memory and non-virtual memory, magnetic cassettes, magnetic tape, magnetic disk storage or other magnetic storage devices, or any other suitable storage media. In no case is the computer readable storage media a propagated signal.

In addition to computer readable storage media, in some implementations storage system 703 may also include computer readable communication media over which at least some of software 705 may be communicated internally or externally. Storage system 703 may be implemented as a single storage device but may also be implemented across multiple storage devices or sub-systems co-located or distributed relative to each other. Storage system 703 may comprise additional elements, such as a controller, capable of communicating with processing system 702 or possibly other systems.

Software 705 (including dependency process 706) may be implemented in program instructions and among other functions may, when executed by processing system 702, direct processing system 702 to operate as described with respect to the various operational scenarios, sequences, and processes illustrated herein. For example, software 705 may include program instructions for implementing a dependency process as described herein.

In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 705 may include additional processes, programs, or components, such as operating system software, virtualization software, or other application software. Software 705 may also comprise firmware or some other form of machine-readable processing instructions executable by processing system 702.

In general, software 705 may, when loaded into processing system 702 and executed, transform a suitable apparatus, system, or device (of which computing device 701 is representative) overall from a general-purpose computing system into a special-purpose computing system customized to support native and non-native dependency processes in an optimized manner. Indeed, encoding software 705 on storage system 703 may transform the physical structure of storage system 703. The specific transformation of the physical structure may depend on various factors in different implementations of this description. Examples of such factors may include, but are not limited to, the technology used to implement the storage media of storage system 703 and whether the computer-storage media are characterized as primary or secondary storage, as well as other factors.

For example, if the computer readable storage media are implemented as semiconductor-based memory, software 705 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Communication interface system 707 may include communication connections and devices that allow for communication with other computing systems (not shown) over communication networks (not shown). Examples of connections and devices that together allow for inter-system communication may include network interface cards, antennas, power amplifiers, RF circuitry, transceivers, and other communication circuitry. The connections and devices may communicate over communication media to exchange communications with other computing systems or networks of systems, such as metal, glass, air, or any other suitable communication media. The aforementioned media, connections, and devices are well known and need not be discussed at length here.

Communication between computing device 701 and other computing systems (not shown), may occur over a communication network or networks and in accordance with various communication protocols, combinations of protocols, or variations thereof. Examples include intranets, internets, the Internet, local area networks, wide area networks, wireless networks, wired networks, virtual networks, software defined networks, data center buses and backplanes, or any other type of network, combination of network, or variation thereof. The aforementioned communication networks and protocols are well known and need not be discussed at length here.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Indeed, the included descriptions and figures depict specific embodiments to teach those skilled in the art how to make and use the best mode. For the purpose of teaching inventive principles, some conventional aspects have been simplified or omitted. Those skilled in the art will appreciate variations from these embodiments that fall within the scope of the disclosure. Those skilled in the art will also appreciate that the features described above may be combined in various ways to form multiple embodiments. As a result, the invention is not limited to the specific embodiments described above, but only by the claims and their equivalents.

What is claimed is:

1. A computing apparatus comprising:
   one or more computer readable storage media;
   one or more processors operatively coupled with the one or more computer readable storage media; and
   program instructions stored on the one or more computer readable storage media that, when executed by the one or more processors, direct the computing apparatus to at least:
   identify a formula in a first cell of a spreadsheet, at least a portion of which includes a non-native argument;
   identify an indirect dependency between the first cell and a second cell in the spreadsheet created by an implicit reference in the non-native argument to the second cell, wherein to identify the indirect dependency, the program instructions direct the computing apparatus to identify the second cell based on a translated dependency for the implicit reference in a dependency datastore associated with the spreadsheet; and
   limit recalculations of the spreadsheet based at least on the indirect dependency.

2. The computing apparatus of claim 1, wherein, to limit the recalculations of the spreadsheet based at least on the indirect dependency, the program instructions direct the computing apparatus to:
   absent any other dependencies between the first cell and any other cells of the spreadsheet, exclude the first cell from recalculations triggered by changes to the other cells of the spreadsheet; and
   include the first cell in recalculations triggered by changes to the second cell.

3. The computing apparatus of claim 2, wherein the program instructions further direct the computing apparatus to:
   parse the non-native argument for the implicit reference to the second cell;
   translate the implicit reference to a native format, resulting in the translated dependency; and
   register the translated dependency in the dependency datastore associated with the spreadsheet.

4. The computing apparatus of claim 3, wherein the formula in the first cell comprises a name of a function native to a spreadsheet application hosting the spreadsheet and wherein the function comprises the non-native argument.

5. The computing apparatus of claim 4, wherein when a recalculation of the recalculations is triggered that includes the first cell, the program instructions direct the computing apparatus to send a request for an external resource to evaluate the non-native argument of the first cell.

6. The computing apparatus of claim 5, wherein to send the request for the external resource to evaluate the non-native argument of the first cell, the program instructions direct the computing apparatus to evaluate the second cell prior to sending the request for the external resource to evaluate the non-native argument of the first cell.

7. The computing apparatus of claim 6, wherein to evaluate the second cell, the program instructions direct the computing apparatus to send a first request to the external resource to evaluate a non-native expression in the second cell.

8. The computing apparatus of claim 7, wherein the formula in the first cell of the spreadsheet comprises a formula native to the spreadsheet application hosting the spreadsheet.

9. One or more computer-readable storage media having program instructions stored thereon that, when executed by one or more processors of a computing device, direct the computing device to at least:
identify a formula in a first cell of a spreadsheet, at least a portion of which includes a non-native argument;
identify an indirect dependency between the first cell and a second cell in the spreadsheet created by an implicit reference in the non-native argument to the second cell, wherein to identify the indirect dependency, the program instructions direct the computing device to identify the second cell based on a translated dependency for the implicit reference in a dependency datastore associated with the spreadsheet; and
limit recalculations of the spreadsheet based at least on the indirect dependency.

10. The one or more computer-readable storage media of claim 9, wherein, to limit the recalculations of the spreadsheet based at least on the indirect dependency, the program instructions direct the computing device to:
absent any other dependencies between the first cell and any other cells of the spreadsheet, exclude the first cell from recalculations triggered by changes to the other cells of the spreadsheet; and
include the first cell in recalculations triggered by changes to the second cell.

11. The one or more computer-readable storage media of claim 10, wherein the program instructions further direct the computing device to:
parse the non-native argument for the implicit reference to the second cell;
translate the implicit reference to a native format, resulting in the translated dependency; and
register the translated dependency in the dependency datastore associated with the spreadsheet.

12. The one or more computer-readable storage media of claim 11, wherein the formula in the first cell comprises a name of a function native to a spreadsheet application hosting the spreadsheet and wherein the function comprises the non-native argument.

13. The one or more computer-readable storage media of claim 12, wherein when a recalculation of the recalculations is triggered that includes the first cell, the program instructions direct the computing device to send a request for an external resource to evaluate the non-native argument of the first cell.

14. The one or more computer-readable storage media of claim 13, wherein to send the request for the external resource to evaluate the non-native argument of the first cell, the program instructions direct the computing device to evaluate the second cell prior to sending the request for the external resource to evaluate the non-native argument of the first cell.

15. The one or more computer-readable storage media of claim 14, wherein to evaluate the second cell, the program instructions direct the computing device to send a first request to the external resource to evaluate a non-native expression in the second cell.

16. The one or more computer-readable storage media of claim 15, wherein the formula in the first cell of the spreadsheet comprises a formula native to the spreadsheet application hosting the spreadsheet.

17. A method of operating a spreadsheet application, the method comprising:
identifying a formula in a first cell of a spreadsheet, at least a portion of which includes a non-native argument;
identifying an indirect dependency between the first cell and a second cell in the spreadsheet created by an implicit reference in the non-native argument to the second cell, wherein identifying the indirect dependency, comprises identifying the second cell based on a translated dependency for the implicit reference in a dependency datastore associated with the spreadsheet; and
limiting recalculations of the spreadsheet based at least on the indirect dependency.

18. The method of claim 17, wherein limiting the recalculations of the spreadsheet based at least on the indirect dependency comprises:
absent any other dependencies between the first cell and any other cells of the spreadsheet, excluding the first cell from recalculations triggered by changes to the other cells of the spreadsheet; and
including the first cell in recalculations triggered by changes to the second cell.

19. The method of claim 18, further comprising:
parsing the non-native argument for the implicit reference to the second cell;
translating the implicit reference to a native format, resulting in the translated dependency; and
registering the translated dependency in the dependency datastore associated with the spreadsheet.

20. The method of claim 19, wherein the formula in the first cell comprises a name of a function native to a spreadsheet application hosting the spreadsheet and wherein the function comprises the non-native argument.

* * * * *